(12) United States Patent
Chang et al.

(10) Patent No.: US 6,970,309 B2
(45) Date of Patent: Nov. 29, 2005

(54) FILTER, COLOR WHEEL USING THE FILTER, AND MANUFACTURING METHOD FOR THE SAME

(75) Inventors: Sean Chang, Taoyuan (TW); Kenny Chen, Banchiau (TW)

(73) Assignee: Delta Electronics, Inc., Taoyuan (TW)

(*) Notice: Subject to any disclaimer, the term of this patent is extended or adjusted under 35 U.S.C. 154(b) by 0 days.

(21) Appl. No.: 10/811,990

(22) Filed: Mar. 30, 2004

(65) Prior Publication Data
US 2004/0233279 A1 Nov. 25, 2004

(30) Foreign Application Priority Data
May 12, 2003 (TW) .............................. 92112776 A

(51) Int. Cl.⁷ .............................. G02B 5/22; G02B 7/00
(52) U.S. Cl. .................. 359/892; 359/885; 359/891; 348/743; 356/418; 353/84; 362/293
(58) Field of Search .............................. 359/891, 892, 359/885; 348/743; 356/418; 353/84; 362/293

(56) References Cited

U.S. PATENT DOCUMENTS

| 4,076,393 | A | * | 2/1978 | Bates | 359/892 |
| 5,868,482 | A | * | 2/1999 | Edlinger et al. | 353/84 |
| 6,598,977 | B1 | * | 7/2003 | Chen | 353/31 |
| 2003/0011911 | A1 | * | 1/2003 | Sung et al. | 359/892 |

FOREIGN PATENT DOCUMENTS

TW 475737 7/2001

* cited by examiner

*Primary Examiner*—Leonidas Boutsikaris
(74) *Attorney, Agent, or Firm*—Birch, Stewart, Kolasch & Birch, LLP

(57) ABSTRACT

A color wheel includes a carrier element, a filter group, and a connection component. The carrier element includes a first carrier, and a second carrier. The carrier element rotates around the central axial line. The first carrier has at least one aperture. The filter group has a transparent zone and a filter bonding zone. The filter group and the carrier element share the central axial line. The filter bonding zone has at least one concave zone. The combining component is simultaneously in the apertures of the first carrier and the filter bonding zone to fix the filter bonding zone of the filter group between the first carrier and the second carrier.

20 Claims, 5 Drawing Sheets

FILTER, COLOR WHEEL USING THE FILTER, AND MANUFACTURING METHOD FOR THE SAME

BACKGROUND OF THE INVENTION

This Nonprovisional application claims priority under 35 U.S.C. § 119(a) on Patent Application No(s). 092112776 filed in TAIWAN on May 12, 2003, the entire contents of which are hereby incorporated by reference.

1. Field of Invention

The invention relates to a color filter, a color wheel using the color filter, and the method for making the same. In particular, the invention relates to a color wheel with a filter that does not be escaped from a carrier element of the color wheel, and the method for making the color wheel.

2. Related Art

The conventional color wheel structure is composed of a carrier and a planar color filter. When the color wheel rotates, the color filter is likely to wiggle and deviate due to the centrifugal force. In particular, when the error between the filter and the carrier is too large, it may result in damages to the filter.

To solve the above problem, an adhesive means has been proposed to combine the filter and the color wheel of the carrier in the prior art. As shown in FIG. 1, the color wheel 100 is obtained by combining to a motor structure 10 an adhesive carrier 12, a loop-shaped planar color filter 14, and another adhesive carrier 16. The surface of the adhesive carrier 16 facing the color filter 14 has some grooves 18. The combination of the color filter 14 and the adhesive carriers 12, 16 is achieved by first putting the color filter 14 on axial protruding part (not labeled) of the central axial line 22 of the adhesive carrier 12. A hard adhesive is coated in the grooves 18. Afterwards, the color filter 14 and the adhesive carrier 16 are attached together for the hard adhesive to touch the color filter 14, cured to form an adhesive layer 20. The method thus combines and fixes the color filter 14 and the adhesive carrier 16 together.

However, in the above structure and method the color filter 14 is a planar, continuous sheet. Although an adhesive is applied between the color filter 14 and the adhesive carrier 16, the resistance of the adhesive layer 20 to the sheer force under high-speed rotations is weaker because the adhesive exists only in the grooves 18 of the adhesive carrier 16.

Simply because of the aforementioned reason, the adhesive cannot be of soft or elastic nature. Nonetheless, if the adhesive is hard it is very difficult for the adhesive to absorb vibrations generated when the color filter is rotating at high speeds. Therefore, there might be noises due to large vibrations at high speeds. Once the vibration reaches a certain extent, the color filter will break and damage.

The color wheel disclosed in the U.S. Pat. No. 5,868,482 has a fairly complicated structure. The adhesive agent between the carrier element and the filter is likely to overflow to the transparent zone of the filter, resulting in filter pollution. The polluted part will have a worse optical quality.

SUMMARY OF THE INVENTION

In view of the foregoing, the invention provides a color wheel to effectively prevent vibrations occurring during high-speed rotations.

Moreover, the invention provides a method for making the color wheel to prevent simultaneously vibrations and deviations from happening to the filter rotating at high speeds.

The disclose color wheel has a carrier element, a filter group, and at least one connection component. The carrier element has a central axial line, a first carrier, and a second carrier. The carrier element rotates around the central axial line. The first carrier has at least one aperture. The filter group has a transparent zone and a filter bonding zone. The filter group and the carrier element share the central axial line. The filter bonding zone has at least one aperture. The connection component falls simultaneously in the apertures of the first carrier and the filter bonding zone, fixing the filter bonding zone of the filter group between the first carrier and the second carrier.

In the disclosed color wheel, the transparent zone protrudes from the edge of the carrier element. The apertures of the filter bonding zone may or may not penetrate through the filter group. Moreover, the second carrier also has apertures. In this case, the surface of the filter bonding zone corresponding to the second carrier also has apertures. The apertures of the filter bonding zone may be the above-mentioned through apertures or different apertures.

The filter group of the disclosed color wheel is comprised of at least one filter. The shape of the filter bonding zone is annular. The connection component is one formed by adhesion. The material can be a soft or elastic gel.

The invention provides a method that prevents the filter of the color wheel from escaping. At least one aperture is formed within the filter combining zone of the filter group. Likewise, at least one aperture is formed on the filter support surface of the color wheel. Afterwards, the connection component is connected to the two sets of apertures for fixing the filter group on the color wheel.

In the above manufacturing method, a second filter supporting surface and the first filter supporting surface of the color wheel hold the filter group. At least a third aperture can be formed on the second filter supporting surface. When the apertures in the filter bonding zone penetrate through the filter bonding zone, the connection component is simultaneously connected to the filter group, the first carrier and the second carrier.

Furthermore, apertures corresponding to the apertures on each filter support surface can be formed on the surface of the filter bonding zone. In this case, the connection component is connected to all the above-mentioned apertures at the same time. In addition, the connection component is formed by adhesive filling.

The invention further provides a filter, which has a transparent zone and a combining zone. The transparent zone surrounds a central axial line. The combining zone surrounds the central axial line and has at least one aperture. The transparent zone surrounds the outer side of the combining zone with the central axial line as its center.

In the above color wheel structure, the filter group and the carriers have corresponding apertures to accommodate the connection component. Therefore, the connection component in. the invention has enough resistance to the sheer force even if it is made of a soft or elastic adhesive agent. The filter group can be avoided from deviation.

Since the connection component is made of a soft or elastic adhesive, it can effectively absorb vibrations generated during high-speed rotations of the color wheel. The invention is thus able to prevent vibrations and deviations of the filter group in from high-speed rotations and the noises thereof.

In the disclosed manufacturing method, the filter group and the carriers are connected using the soft or elastic connection components. Thus, the precision can be appropriately relaxed to reduce the costs.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE PREFERRED EMBODIMENT

The present invention will be apparent from the following detailed description, which proceeds with reference to the accompanying drawings, wherein the same references relate to the same elements.

Figure 1:
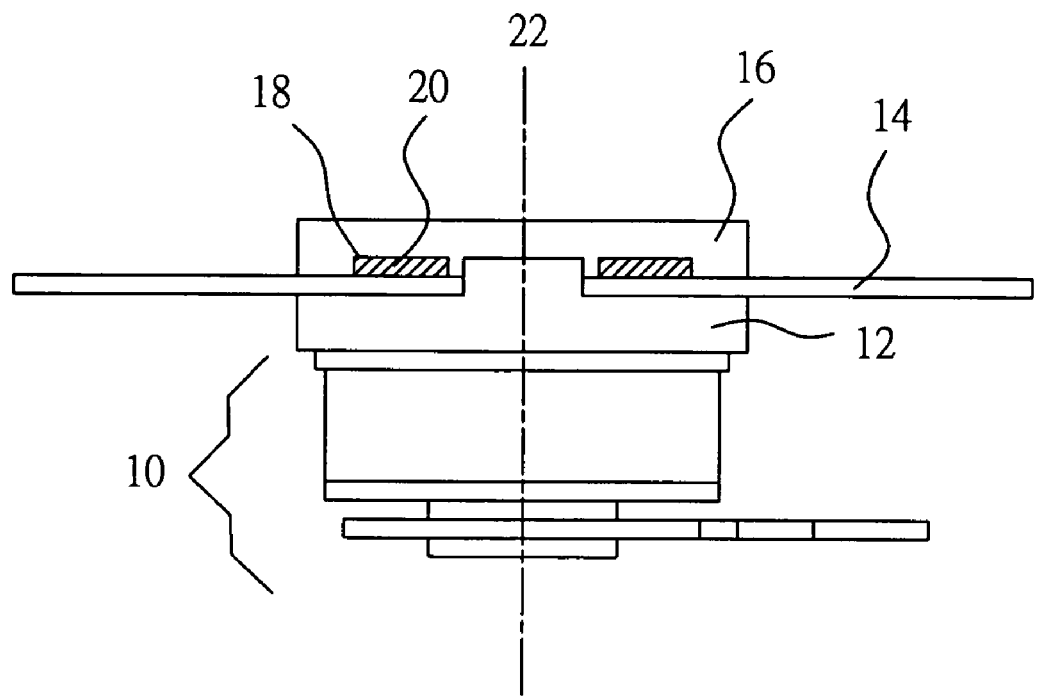
FIG. 1 shows a schematic view of the structure in a conventional color wheel.
Figure 2:
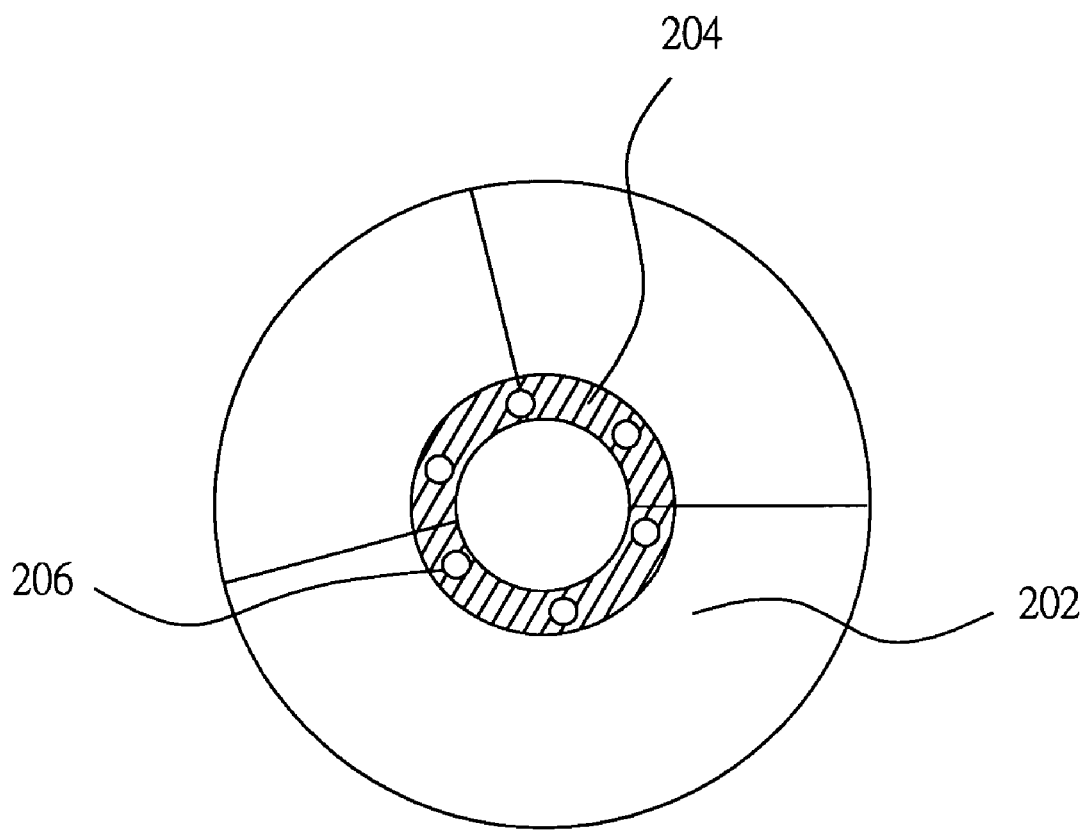
FIG. 2 is a schematic view of the filter group according to a preferred embodiment of the invention.

With reference to FIG. 2, the filter group 200 of the invention is made of one or more filters. For instance, the filter group 200 has a planar annular thin sheet structure. It can be divided into a transparent zone 202 and a filter bonding zone 204. The filter bonding zone 204 has at least one aperture 206 not positioned on a central axial line.

The transparent zone 202 is used to provide a high penetration rate to change the color of light after the beam of light passes through it. An example of the transparent zone 202 is a zone coated with an optical interferometer film.

The filer bonding zone 204 is a zone for the filter group 200 to combine with the color wheel or carrier to be described later. The apertures 206 of the filter bonding zone 204 are used for the connection component to combine with the filter bonding zone 204. The apertures 206 may or may not penetrate through the filter bonding zone 204. The opening of the apertures 206 can be cave-like, groove-like, or any other shape.

Figure 3:
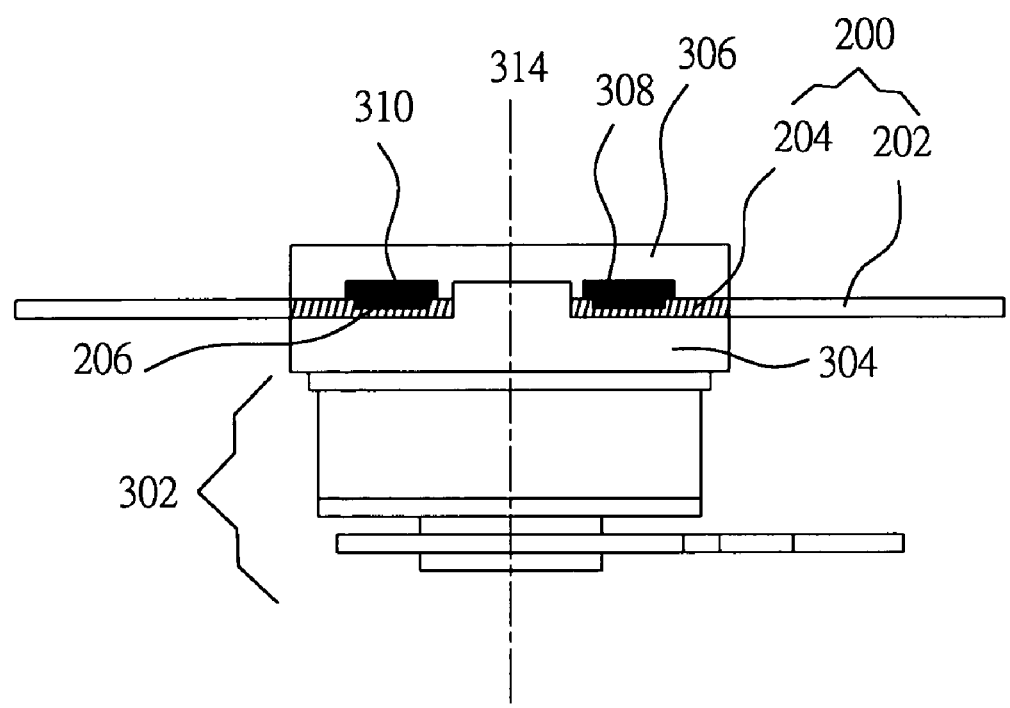
FIG. 3 is a schematic view of the color wheel according to a first preferred embodiment of the invention.

As shown in FIG. 3, the color wheel 300 according to a first preferred embodiment is comprised of a carrier 304, a filter group 200 with apertures 206, a carrier 306 with apertures 308 not positioned on the central axial line, and a connection component 310 built on a motor structure 302. The connection component 310 is simultaneously mounted in the apertures 206, 308, thereby tightly binding the filter group with the carrier 306.

The motor structure 302 is used to drive the color wheel 300 to rotate. The carrier 304 of the color wheel 300 is connected to the rotor (not shown) of the motor structure 302, so that the rotor drives the carrier 304 that in turn brings the color wheel 300 into rotation.

The carriers 304, 306 have a matching structure for connections. The carriers 304, 306 rotate around the central axial line 314. A space (not labeled) for accommodating the filter group 200 is reserved between the carriers 304, 306. In the current embodiment, the carrier 304 is fixed on the motor structure 302. The surface of the carrier 306 facing the above space has at least one aperture 308. The apertures 308 may or may not penetrate through the carrier 306. The opening of the apertures 308 can be cave-like, groove-like, or any other shape.

The filter group here and the carriers 304, 306 share the central axial line 314. The transparent zone 202 of the filter group 200 protrudes from the edges of the carriers 304, 306.

The connection component 310 is tightly connected within the apertures 206 of the filter group 200 and the apertures 308 of the carrier 306. The connection component 310 is made of a soft, elastic, or hard gel. Moreover, the connection component 310 can have a structure with a hard core and a soft or elastic covering.

In the following, we use an explicit example to explain the disclosed method for making the color wheel 300. First, the carrier 304 is connected to the motor structure 302. At least one aperture 206 is formed in the filter bonding zone 204 of the filter group 200. The surface of the carrier 306 corresponding to the aperture 206 is formed with at least one aperture 308.

Afterwards, the filter group 200 is placed on the carrier 304. The filter group 200 and the carrier 304 share the central axial line 314. The apertures 206, 308 of the filter group 200 and the carrier 306 are coated with an adhesive agent. The filter group 200 and the carrier 306 are connected to cure the adhesive agent, forming the connection component 310. The material of the adhesive agent can be a soft or elastic gel.

Furthermore, the disclosed manufacturing method is not limited by the above example. One may modify it to first connect the carrier 306 and the filter group 200 using the connection component 310, followed by connecting the carrier 304 with the carrier 306.

The connection component 310 in the color wheel 300 obtained using the above-mentioned means is simultaneously connected between the carrier 306 and the filter group 200. In accord with the connection method of the carriers 304, 306, the filter group can be firmly held in between, achieving the goal of preventing the filter group from escaping.

Figure 4:
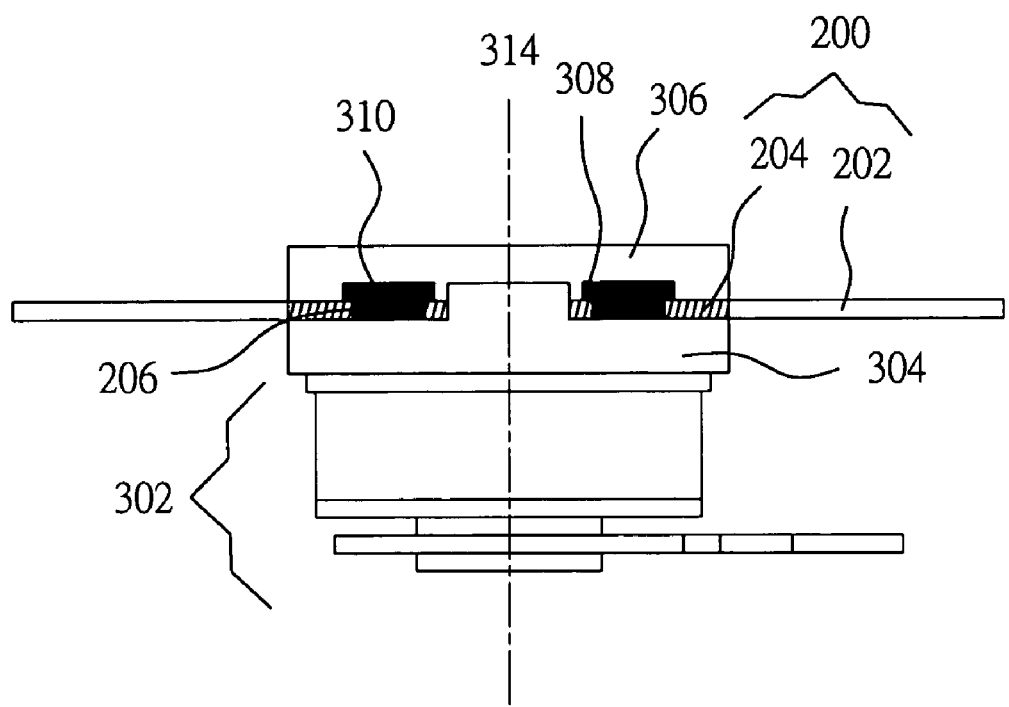
FIG. 4 is a schematic view of the color wheel according to a second embodiment of the invention.

Moreover, the color wheel 400 of the invention can be the one shown in FIG. 4, which is a second embodiment. From the drawing, we see that the apertures 206 in the filter bonding zone 204 are holes or grooves penetrating through the filter group 200. Therefore, when the connection component 310 is connected to the apertures 206, 308, it will be tightly mounted to the surface of the carrier 304. As the color wheel 400 rotates, the current embodiment has a better resistance to the sheer force than the color wheel 300 in the first embodiment.

Figure 5:
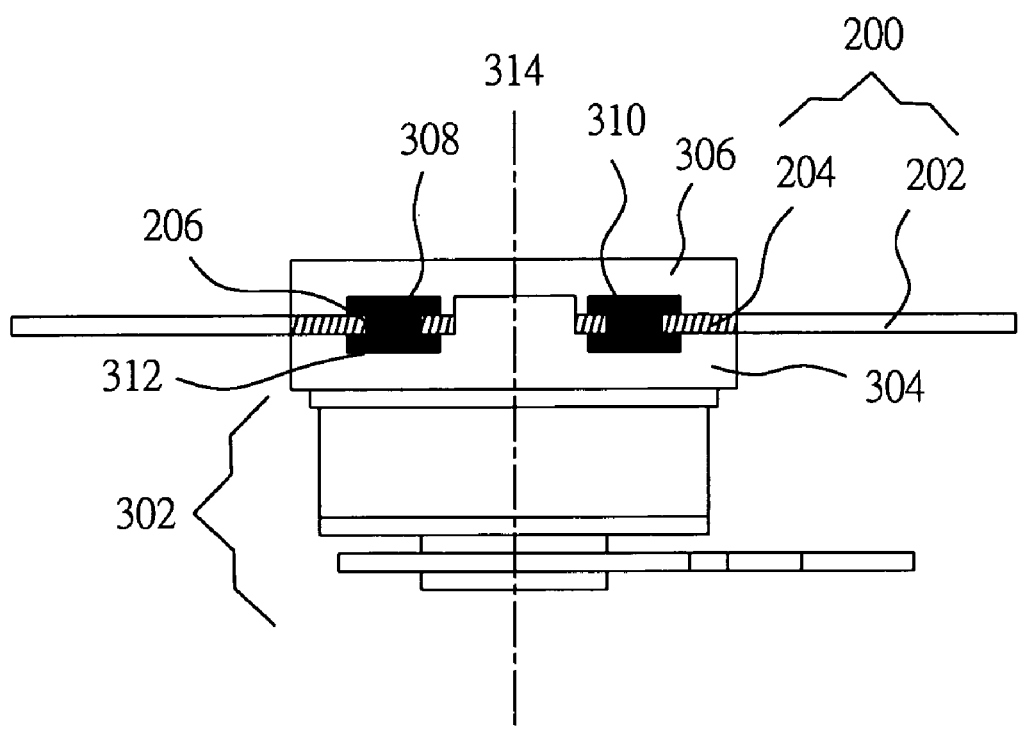
FIG. 5 is a schematic view of the color wheel according to a third embodiment of the invention.

FIG. 5 shows a third embodiment of the color wheel 500. In this embodiment, apertures 308, 312 are formed in the carriers 304, 306 and match with each other. While the filter group 200 is fixed, the connection component 310 also fills the apertures 308, 312, 206. As the connection component 310 is already held between the carriers 304, 306, the connection component 310 obtains a larger resistance to the sheer force when the color wheel 500 rotates. The filter group 200 thus also has a larger resistance to the sheer force.

The apertures 312 may or may not penetrate through the carrier 304. The opening of the apertures 312 can be cave-like, groove-like, or any other shape.

The disclosed filter group can also be formed with different apertures on different surfaces facing the two carriers in the filter bonding zone. The apertures on each surface match the corresponding apertures they face. Afterwards, the connection components are filled in the corresponding apertures. The surfaces of the filter group facing different carriers are formed with independent connection components. Thus, the filter group can simultaneously obtain connection forces in different directions, greatly increasing the resistance of the filter group to sheer forces when the color wheel rotates.

In summary, the filter group and the carriers have corresponding apertures to accommodate connection components. Therefore, even if the connection components are made of a soft or elastic adhesive agent, there is still enough resistance to the sheer force to prevent the filter group from deviating.

Moreover, as the connection components are made of a soft or elastic adhesive agent, they can effectively absorb vibrations generation by the color wheel in high-speed rotations. Consequently, the invention can avoid vibrations, noises, and deviations of the filter group at high-speed rotations.

In the disclosed manufacturing method, the filter group and the carriers are connected using the soft or elastic connection components, the precision can be appropriately relaxed to reduce the costs.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A color wheel comprising:
   a carrier element, which has a central axial line, a first carrier, and a second carrier, and rotates around the central axial line, the first carrier having at least a first aperture positioned off of the central axial line;
   a filter group, which has a transparent zone and a filter bonding zone, the filter group and the carrier element sharing the central axial line and the filter bonding zone having at least a second aperture positioned off of the central axial line; and
   at least one connection component, which is simultaneously mounted in the first aperture and the second aperture to fix the filter bonding zone of the filter group between the first carrier and the second carrier.

2. The color wheel of claim 1, wherein the transparent zone protrudes from the edge of the carrier element.

3. The color wheel of claim 1, wherein the connection component includes an adhesive component.

4. The color wheel of claim 1, wherein the second aperture does not penetrate through the filter group.

5. The color wheel of claim 1, wherein the first aperture corresponds to the second aperture.

6. The color wheel of claim 1, wherein the opening of the second aperture is selected from the group comprising groove-like and cave-like shapes and the second aperture surrounds the central axial line.

7. The color wheel of claim 6, wherein the filter group comprises at least one filter.

8. The color wheel of claim 1, wherein the second aperture penetrates through the filter group.

9. The color wheel of claim 8, wherein the second carrier further comprises at least a third aperture corresponding to the second aperture.

10. The color wheel of claim 9, wherein the connection component is simultaneously mounted in the first aperture, the second aperture, and the third aperture to fix the filter bonding zone of the filter group between the first carrier and the second carrier.

11. The color wheel of claim 1, wherein the filter group further comprises at least a fourth aperture and the fourth aperture and the second aperture are located on corresponding opposite surfaces.

12. The color wheel of claim 11, wherein the second carrier further comprises at least a fifth aperture corresponding to the fourth aperture.

13. The color wheel of claim 12, wherein the connection component is simultaneously mounted in the first aperture, the second aperture, the fourth aperture, and the fifth aperture to fix the filter bonding zone of the filter group between the first carrier and the second carrier.

14. The color wheel of claim 1, wherein the opening of the first aperture is selected from the group comprising groove-like and cave-like shapes.

15. The color wheel of claim 1, wherein the material of the connection component is a soft gel.

16. The color wheel of claim 1, wherein the material of the connection component is an elastic gel.

17. A method for making a color wheel, which comprises the steps of:
   forming at least a first aperture, which is positioned off of a central axial line of a filter, in a filter bonding zone of the filter group;
   forming at least a second aperture, which is positioned off of the central axial line, on a first carrier of a carrier element; and
   connecting a connection component to the first aperture and the second aperture to fix the filter group onto the carrier element.

18. The method of claim 17 further comprising the step of holding the filter group using the first carrier and a second carrier of the carrier element.

19. The method of claim 18, wherein the connection component is connected to the filter group, the first carrier and the second carrier simultaneously.

20. A color wheel comprising:
   a carrier element, which has a central axial line, a first carrier, and a second carrier, and rotates around the central axial line, the first carrier having at least a first aperture;
   a filter group, which has a transparent zone and a filter bonding zone, the filter group and the carrier element sharing the central axial line and the filter bonding zone having at least a second aperture; and
   at least one connection component, which is simultaneously mounted in the first aperture and the second aperture to fix the filter bonding zone of the filter group between the first carrier and the second carrier, wherein the connection component includes an adhesive component.

* * * * *